US 8,405,959 B2

(12) United States Patent
Lee et al.

(10) Patent No.: US 8,405,959 B2
(45) Date of Patent: Mar. 26, 2013

(54) VERTICAL POSITIONING UNIT FOR DISPLAY DEVICE AND DISPLAY DEVICE HAVING THE SAME (75) Inventors: Ok Keun Lee, Suwon-si (KR); Jin Kwon, Seoul (KR); Sang Il Park, Namyangju-si (KR); Eui Seok Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 12/875,202

(22) Filed: Sep. 3, 2010

(65) Prior Publication Data
US 2011/0058322 A1    Mar. 10, 2011

(51) Int. Cl.
 *G06F 1/16* (2006.01)
(52) U.S. Cl. .................. 361/679.01; 248/125.2
(58) Field of Classification Search ............. 361/679.01; 248/125.1, 125.2
See application file for complete search history.

(56) References Cited

U.S. PATENT DOCUMENTS

| 6,994,306 | B1 | 2/2006 | Sweere et al. |
| 7,036,787 | B1* | 5/2006 | Lin ................................ 248/676 |
| 7,124,984 | B2* | 10/2006 | Yokouchi et al. .......... 248/125.8 |
| 7,213,792 | B2* | 5/2007 | Choi ............................ 248/279.1 |
| 7,395,992 | B2* | 7/2008 | Jung ........................... 248/176.3 |
| 7,506,853 | B2 | 3/2009 | Sweere et al. |
| 7,643,276 | B2* | 1/2010 | Shin ......................... 361/679.06 |
| 7,644,897 | B2* | 1/2010 | Shin ............................ 248/176.1 |
| 7,681,845 | B1* | 3/2010 | Chang ............................ 248/161 |
| 7,694,919 | B2* | 4/2010 | Lee ............................ 248/123.11 |
| 7,694,920 | B2* | 4/2010 | Lien et al. ................... 248/125.8 |
| 7,708,243 | B2* | 5/2010 | Wang et al. ..................... 248/157 |
| 7,712,711 | B2* | 5/2010 | Jang ............................ 248/125.8 |
| 7,764,491 | B2* | 7/2010 | Zhao et al. ................. 361/679.22 |
| 7,784,747 | B2* | 8/2010 | Gan et al. ........................ 248/132 |
| 7,789,354 | B2* | 9/2010 | Gan et al. ..................... 248/125.8 |
| 7,789,355 | B2* | 9/2010 | Gan et al. ........................ 248/157 |
| 7,810,773 | B2* | 10/2010 | Chi .............................. 248/278.1 |
| 7,815,154 | B2* | 10/2010 | Oh et al. ........................ 248/176.3 |
| 7,854,417 | B2* | 12/2010 | Gan et al. ........................ 248/161 |
| 7,874,530 | B2* | 1/2011 | Kim et al. ...................... 248/176.1 |
| 8,047,487 | B2* | 11/2011 | Hwang et al. ................. 248/284.1 |
| 8,201,782 | B2* | 6/2012 | Fan ............................... 248/125.8 |
| 8,201,792 | B2* | 6/2012 | Yuan et al. ..................... 248/299.1 |
| 2004/0011932 | A1* | 1/2004 | Duff ............................... 248/157 |
| 2006/0291149 | A1* | 12/2006 | Suzuki et al. ................. 361/679 |
| 2007/0195495 | A1* | 8/2007 | Kim et al. ....................... 361/681 |
| 2007/0205340 | A1* | 9/2007 | Jung ............................ 248/125.9 |
| 2007/0217134 | A1* | 9/2007 | Shin ............................... 361/681 |
| 2008/0237414 | A1* | 10/2008 | Lien et al. ..................... 248/125.2 |
| 2010/0008032 | A1* | 1/2010 | Wang ......................... 361/679.22 |
| 2011/0019346 | A1* | 1/2011 | Liu ............................. 361/679.01 |

* cited by examiner

*Primary Examiner* — Lisa Lea Edmonds
(74) *Attorney, Agent, or Firm* — Stanzione & Kim, LLP (57) ABSTRACT

An vertical positioning unit for an image display unit includes an elastic member having a biasing part extended in a length direction of the vertical positioning unit to constantly exert an elastic force in a direction across a moving direction of a sliding member which is mounted to a stand member to be movable up and down. Accordingly, a slim structure of the stand member may be achieved.

20 Claims, 12 Drawing Sheets

VERTICAL POSITIONING UNIT FOR DISPLAY DEVICE AND DISPLAY DEVICE HAVING THE SAME

CROSS-REFERENCE TO RELATED APPLICATIONS

This application claims the benefit of priority under 35 U.S.C. §119 from Korean Patent Application No. 2009-0084401, filed on Sep. 8, 2009 in the Korean Intellectual Property Office, the disclosure of which is incorporated herein by reference in its entirety.

BACKGROUND

1. Field of the Invention

Embodiments of the present general inventive concept relate to an up-down unit of a stand to adjust an installation height of an image display device.

2. Description of the Related Art

Stands are widely used to install image display devices, such as computer monitors and televisions, at a predetermined height from the installation floor.

The stand that supports an image display device may rotate or slide a screen of the image display device up and down and left and right, as desired by a user. An installation height of the image display device may be adjusted by moving the entire image display device up and down.

Although the trend in image display devices is toward reduction in thickness, it has been hard to achieve the slim structure owing to an up-down unit of the stand structured to adjust the installation height of the image display device.

SUMMARY

Therefore, it is an aspect of the present general inventive concept to provide an vertical positioning unit of a stand, which is capable of adjusting an installation height of an image display device while also achieving a slim structure of the stand.

Additional features and utilities of the present general inventive concept will be set forth in part in the description which follows and, in part, will be obvious from the description, or may be learned by practice of the general inventive concept.

Features and/or utilities of the present general inventive concept may be achieved by an vertical positioning unit for an image display device including a sliding member moved up and down so that a display unit may be connected to a stand member to be movable up and down; a spring supporting member formed at the sliding member and an elastic member constantly exerting an elastic force to the spring supporting member in a direction across the moving direction of the sliding member, while the sliding member is moving up and down.

The vertical positioning unit may further include a guide unit to guide the movement of the sliding member so that the sliding member is not shaken in a lateral direction during the up and down movement.

The elastic member may include a fixing part, a biasing part extended in a length direction to press the spring supporting member, and an elastic part interconnecting the fixing part and the biasing part so as to apply an elastic force to the biasing part.

The spring supporting member may include a roller member supported by the biasing part.

The spring supporting member may include first and second rollers arranged in a lateral direction, the elastic part may include first and second elastic parts formed at both ends of the fixing part, and the biasing part may include first and second biasing parts extended respectively from the first and the second elastic parts.

The first and the second biasing parts may be disposed between the first and the second rollers to exert elastic forces in a direction of being spaced from each other.

The first and the second rollers may be disposed between the first and the second biasing parts exerting elastic forces in a direction toward each other.

The elastic part may include first and second elastic parts extended respectively from both ends of the fixing part, the biasing part may include first and second biasing parts extended respectively from the first and the second elastic parts, and the spring supporting member may be disposed between the first and the second biasing parts exerting elastic forces toward each other.

The guide unit may include a guide slot formed on the stand member in a vertical direction and a guide projection formed at the sliding member to be inserted in the guide slot.

The guide projection may include a roller inserted in the guide slot.

The guide unit may include a guide slot formed on the stand member in a vertical direction and equipped with a rack gear unit at one side thereof; and a gear unit formed at the sliding member to be inserted in the guide slot and meshed with the rack gear unit.

Features and/or utilities of the present general inventive concept may also be achieved by an image display device including a display unit, a stand member connected to a rear surface of the display unit, and an vertical positioning unit to adjust an installation height of the display unit. The vertical positioning unit may have a sliding member movable in the up and down direction and an elastic member including a biasing part elastically and constantly supporting the sliding member in a direction across the moving direction of the sliding member.

The biasing part may be extended along the moving direction of the sliding member.

The biasing part may have a curved form.

The image display device may further include a spring supporting member protruded from the stand member to be elastically supported by the biasing part.

The biasing part may exert an elastic force from the center toward a lateral side of the sliding member.

A pair of the spring supporting members may be arranged in a lateral direction, and the biasing part may include first and second biasing parts disposed at an interval between the spring supporting members and curvedly extended to be spaced from each other from an upper part toward a lower part.

The biasing part may exert an elastic force in a direction from a lateral side toward the center of the sliding member.

The biasing part may include first and second biasing parts curvedly extended in a direction to gradually meet each other from an upper part toward a lower part, and the spring supporting member may be disposed between the first and the second biasing parts.

A pair of the spring supporting members may be arranged in a lateral direction to be supported by the first and the second biasing parts, respectively.

Features and/or utilities of the present general inventive concept may be achieved by a vertical positioning unit of a display device including a stand, a sliding member to move up and down with respect to the stand along a vertical axis, and an elastic member fixed with respect to the stand to exert a constant force on the sliding member. The sliding member may include an elastic member support device to receive the constant force exerted by the elastic member, and the elastic member may exert the force against the elastic member support device in a direction substantially perpendicular to the vertical axis.

One of the stand and the sliding member may include a guide projection and the other of the stand and the sliding member may include a guide groove to receive the guide projection, and the guide projection may move within the guide groove to guide the movement of the sliding member in along the vertical axis with respect to the stand.

Each of the guide projection and the guide groove may include teeth to interact with each other as the sliding member moves with respect to the stand.

The stand may include the guide groove, the guide groove may include at least one recess protruding in a direction substantially perpendicular to the length axis of the groove, and the guide groove may include a rack including the teeth, the rack being fixed to the stand via at least one hook connected to the at least one recess.

The elastic member may include a first part that is fixed with respect to the stand and a second part extending from the first part to move with respect to the stand as the sliding member moves with respect to the stand, and the second part may exert the force against the elastic member support device.

The first part may include a loop portion having a shape of an incomplete circle, and the second part may include an extended curved portion having a length corresponding at least to a range of movement of the sliding member with respect to the stand, such that the elastic member support device contacts the second part of the elastic member at a point closer to the first part of the elastic member when the elastic member is located at one end of the range of movement of the sliding member with respect to the stand, and the elastic member support device contacts the second part of the elastic member closer to an end of the second part when the sliding member is at a second end of the range of movement of the sliding member with respect to the stand.

The elastic member may include two first parts and two second parts connected by a connecting part that connects ends of each of the two first parts, and the connecting part may be mounted to the stand.

The vertical positioning unit may include only one elastic member support device, and the two second parts may simultaneously exert force against opposite sides of the elastic member support device.

The elastic member support device may include two elastic member support devices spaced apart from each other in a horizontal direction, and the two second parts of the elastic member may exert force against separate respective elastic member support devices.

When a vertical axis located at a substantially center portion of the sliding member in a horizontal direction is defined as a horizontal center of the sliding member, a portion of the second part of the elastic member located immediately adjacent to the first part of the elastic member may be closer to the horizontal center of the sliding member than any surface of the elastic member support device.

The second part of the elastic member may exert the force against a surface of the elastic member support device facing the horizontal center of the sliding member.

The elastic member may exert the force against the surface of the elastic member in a direction substantially perpendicular to the vertical axis.

The direction substantially perpendicular to the vertical axis may be inclined with respect to the horizontal axis.

A portion of the second part of the elastic member located immediately adjacent to the first part of the elastic member may be farther from the horizontal center of the sliding member than any surface of the elastic member support device.

The second part of the elastic member may exert the force against a surface of the elastic member support device facing away from the horizontal center of the sliding member.

The elastic member support device may be a roller that rotates with respect to the sliding member.

The elastic member may be located between the stand and the sliding member.

Features and/or utilities of the present general inventive concept may also be realized by an image display device including an image display unit, a stand to support the image display unit with respect to a fixed surface, a sliding member to move up and down with respect to the stand along a vertical axis, and an elastic member fixed with respect to the stand to exert a constant force on the sliding member. The sliding member may include an elastic member support device to receive the constant force exerted by the elastic member, and the elastic member may exert the force against the elastic member support device in a direction substantially perpendicular to the vertical axis.

BRIEF DESCRIPTION OF THE DRAWINGS

These and/or other features of the present general inventive concept will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
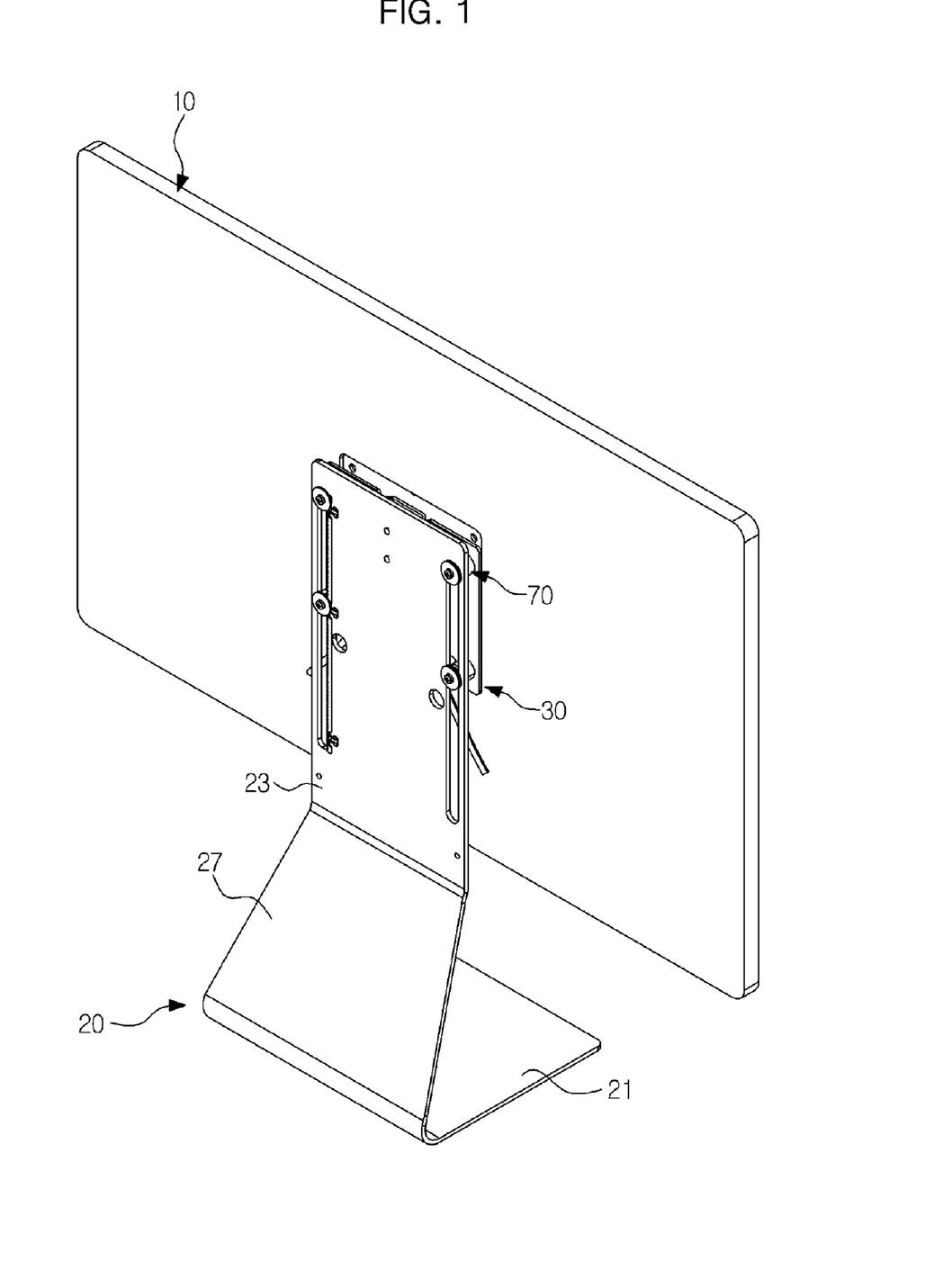
FIG. 1 is a perspective view showing a rear side of an image display device according to one embodiment of the present general inventive concept.
Figure 2:
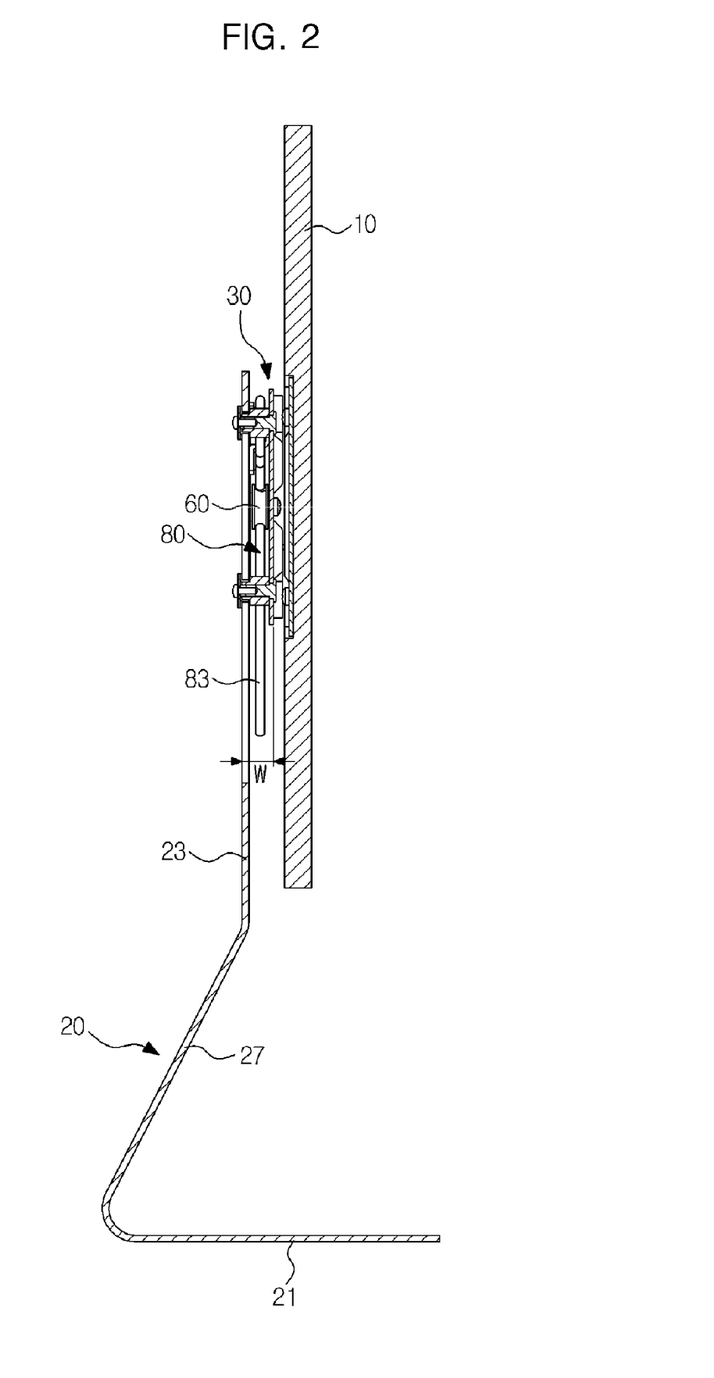
FIG. 2 is a side view of the image display device.

FIG. 1 is a perspective view showing a rear side of an image display device according to one embodiment of the present general inventive concept, and FIG. 2 is a side view of the image display device.

As shown in FIG. 1 and FIG. 2, the image display device includes a display unit 10 such as a liquid crystal display (LCD) and a plasma display panel (PDP), and a stand member 20 supporting the display unit 10 at a predetermined height from a reference plane, such as the installation floor.

The stand member 20 may include a base part 21 supported by the installation floor, a vertical part 23 connected to the display unit 10, and a connecting part 27 interconnecting the base part 21 and the vertical part 23.

An up-down unit or vertical positioning unit 30 is provided between the vertical part 23 of the stand member 20 and a rear surface of the display unit 10, to adjust an installation height of the display unit 10 with respect to a reference plane, such as a floor or surface.

According to the present embodiment, the vertical positioning unit 30 of the display unit 10 may have a slim form with a small width W disposed between the display unit 10 and the vertical part 23 of the stand member 20 as shown in FIG. 2.

Figure 3:
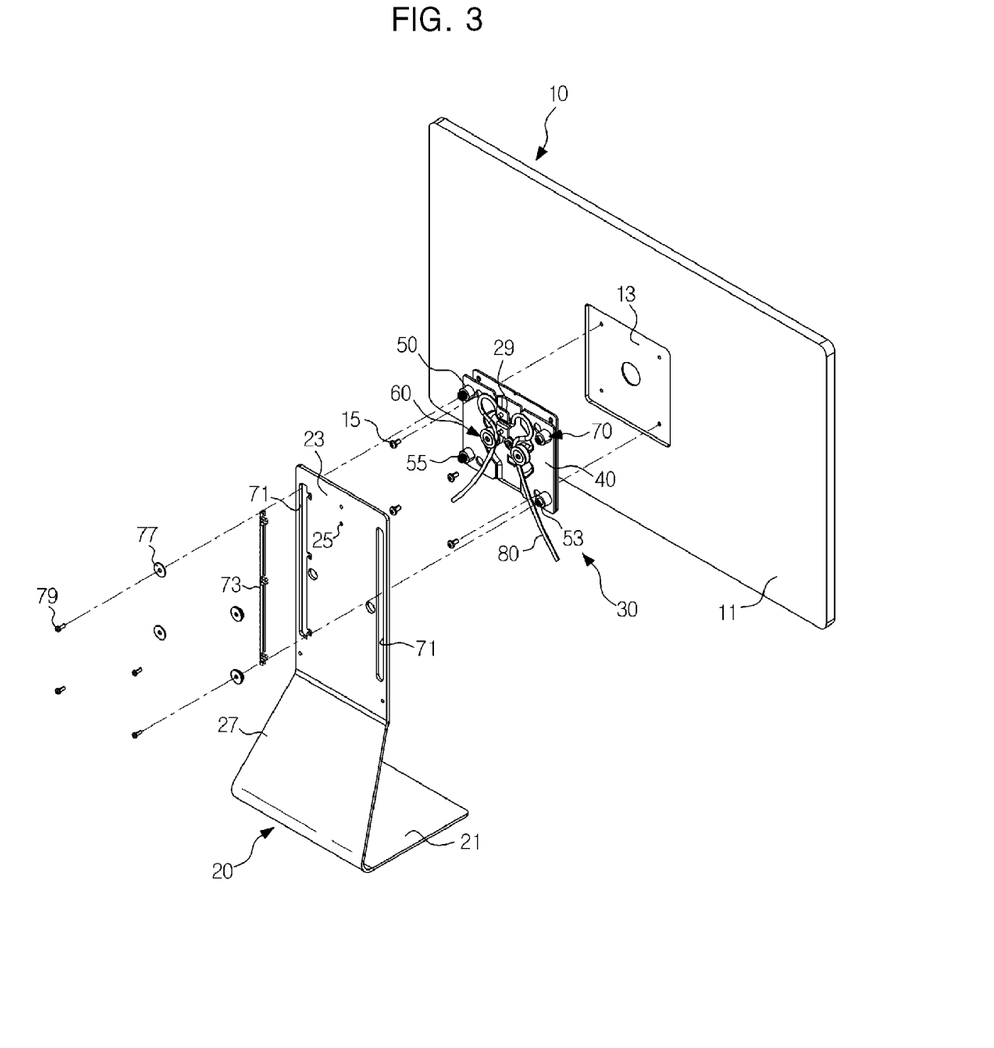
FIG. 3 is an exploded perspective view to illustrate the connection structure of an vertical positioning unit for the image display device.
Figure 4:
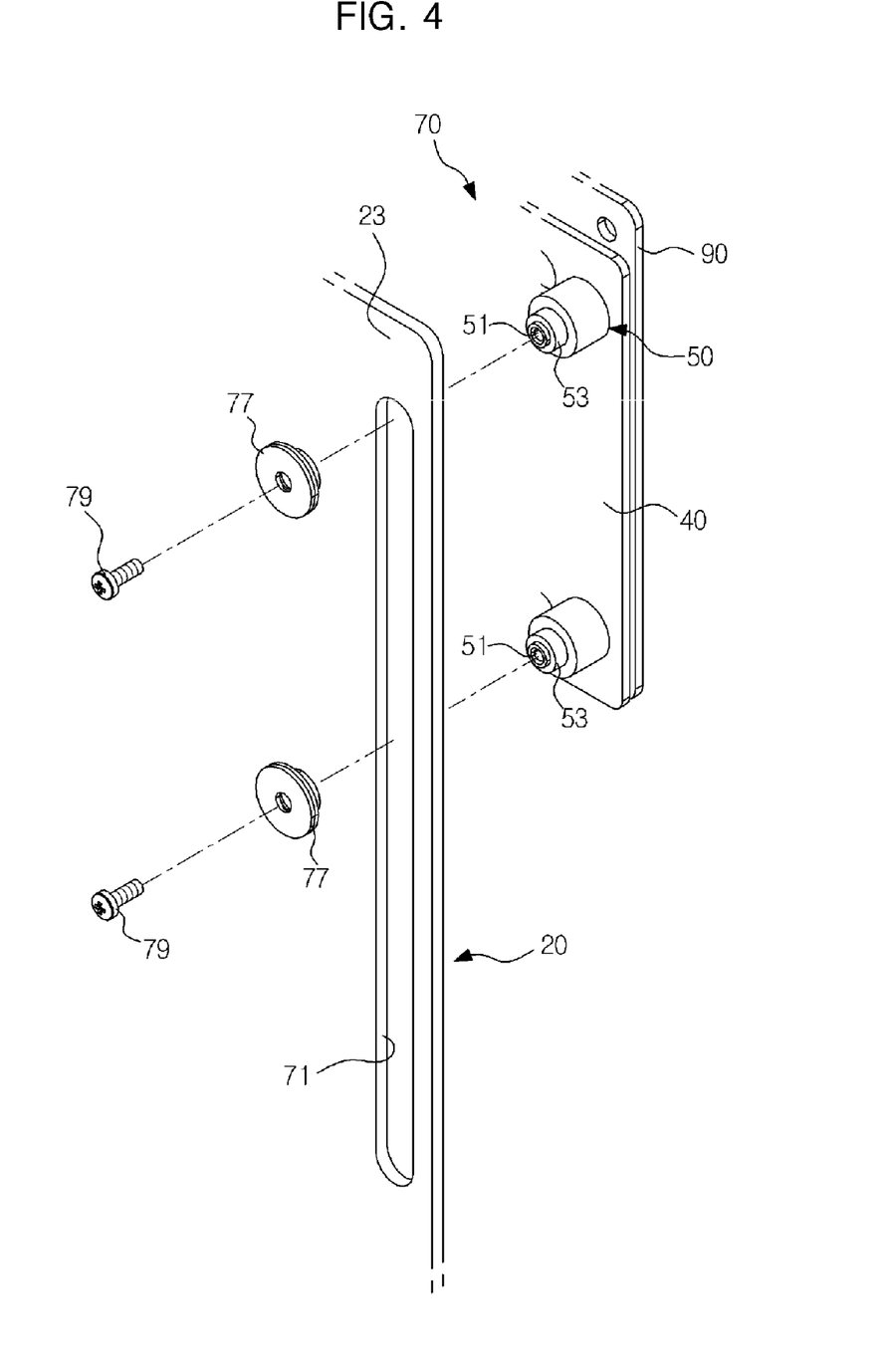
FIG. 4 is an exploded perspective view to illustrate the connection structure of a guide unit of the vertical positioning unit.
Figure 5:
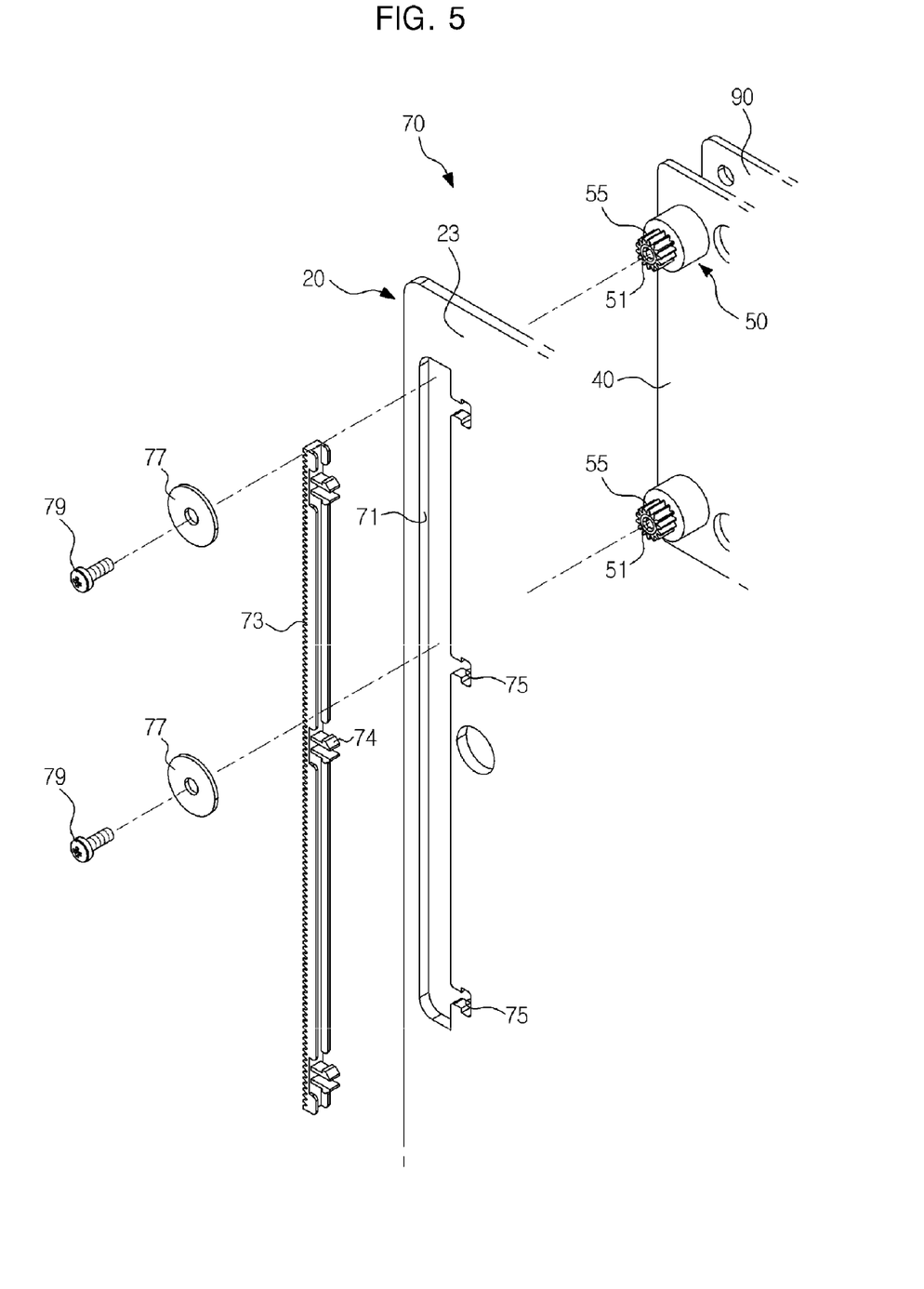
FIG. 5 is an exploded perspective view to illustrate the connection structure of a modified version of the guide unit of the vertical positioning unit.
Figure 6:
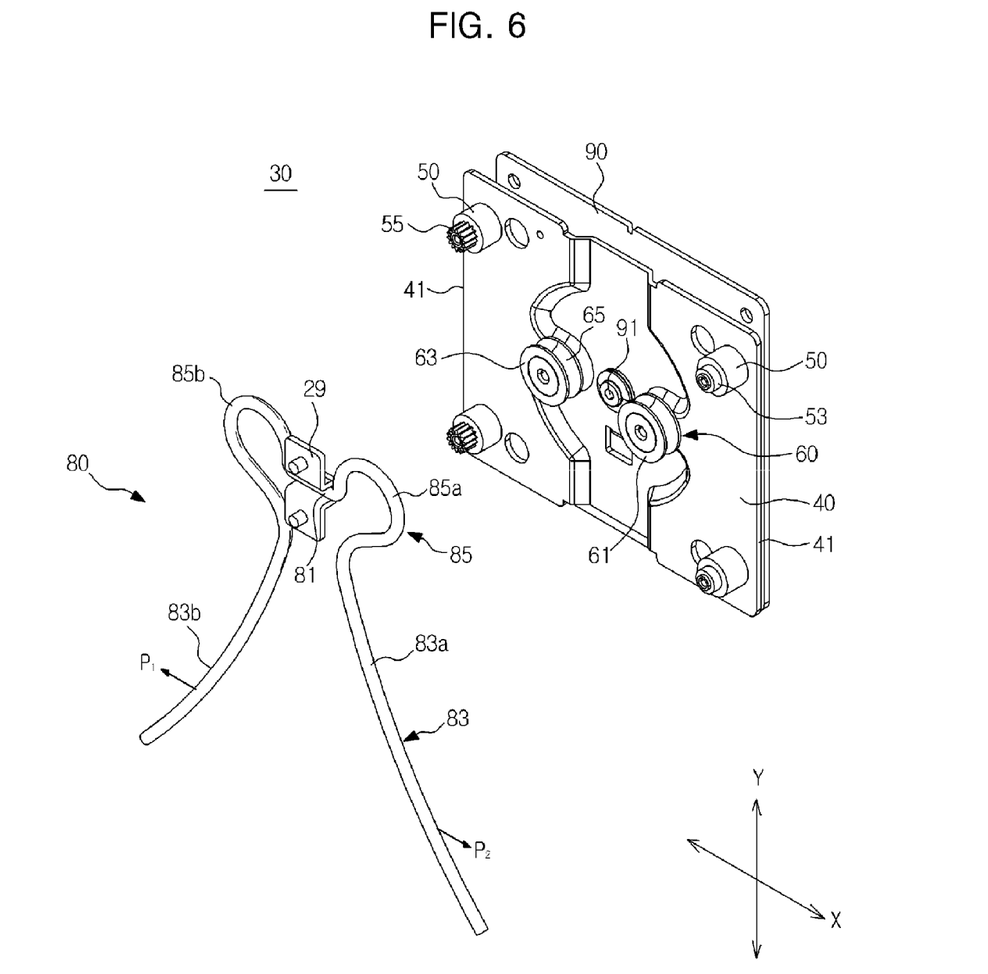
FIG. 6 is an exploded perspective view of the vertical positioning unit according to the embodiment of the present general inventive concept.
Figure 7:
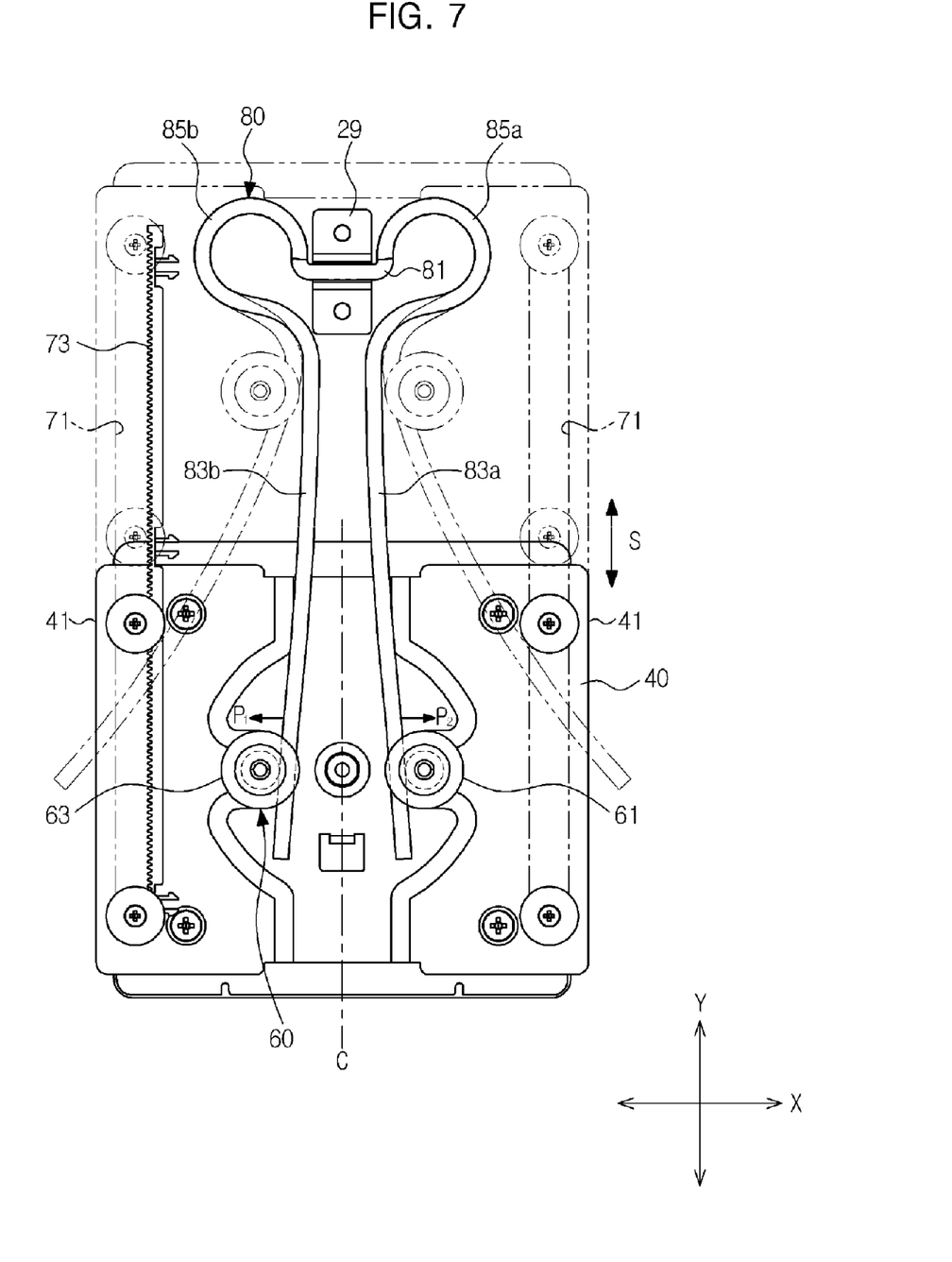
FIG. 7 is a view showing the operational state of the vertical positioning unit of the image display device, according to the embodiment of the present general inventive concept.

FIG. 3 is an exploded perspective view to explain the connection structure of an vertical positioning unit for the image display device. FIG. 4 is an exploded perspective view to explain the connection structure of a guide unit of the vertical positioning unit, according to one embodiment of the present general inventive concept. FIG. 5 is an exploded perspective view to explain the connection structure of a modified version of the guide unit of the vertical positioning unit. FIG. 6 is an exploded perspective view of the vertical positioning unit according to the embodiment of the present general inventive concept, and FIG. 7 is a view showing the operational state of the vertical positioning unit of the image display device according to the embodiment of the present general inventive concept.

Referring to FIG. 3, the vertical positioning unit 30 of the image display device includes a sliding member 40 mounted to the stand member 20 to be movable in the up and down direction, and a guide unit 70 guiding the movement of the sliding member 40 so that the sliding member 40 is not shaken during the movement.

The sliding member 40 is in the form of a rectangular plate, one side of which is connected to the display unit 10 and the other side of which is slidably connected with the stand member 20.

To this end, a receiving recess 13 to receive the sliding member 40 is formed in the center of the rear surface 11 of the display unit 10. The sliding member 40 received in the receiving recess 13 may be fixed in the receiving recess 13 through fixing screws 15.

The guide unit 70 includes guide slots 71 extended in the up and down direction on both sides on the vertical part 23 of the stand member 20, and guide projections 50 inserted and moved in the guide slots 71.

The guide projections 50 may be protruded rearward on both sides of the siding member 40 corresponding to the position of the guide slots 71.

The guide projections 50 may be slidably mounted in the guide slots 71 by being inserted in the guide slots 71 and fastened through washers 77 and fixing bolts 79 from a rear part of the vertical part 23.

Referring to FIG. 4, each of the guide projections 50 may include a roller 53 connected with a roller shaft 51 to be inserted and moved in the guide slot 71.

Also, as shown in FIG. 5, the guide projection 51 may include a gear unit 55 connected with the roller shaft 51, the gear unit 55 being movable in mesh with a rack gear unit 73 formed at one of the guide slots 71 disposed on one side of the stand member 20.

The rack gear unit 73 may be removably connected to the guide slot 71 by having a hook part 74 for engagement with a hook recess 75 formed on one side of the guide slot 71.

Although the guide unit 70 shown in FIG. 3 is designed to have the rollers 53 formed at the guide projections 50 of one side of the vertical positioning unit 30, and the gear units 55 formed at the guide projections 50 of the other side, all the guide projections 50 may have only the rollers 53 or the gear units 55.

In addition, the sliding member 40 shown in FIG. 3 is fixed to the display unit 10 at one side thereof and is slidably engaged with the guide slots 71 formed on the vertical part 23 of the stand member 20 at the other side. However, not limited to this embodiment, the guide slot 71 may be formed at the display unit 10 so that one side of the sliding member 40 is fixed to the vertical part 23 of the stand member 20 whereas the other side is slidably engaged with the guide slots 71 of the display unit 10.

Furthermore, the vertical positioning unit 30 may additionally include an elastic member or spring 80 to elastically support the sliding member so that the sliding member 40 is maintained in an adjusted position unless an external force is applied to the sliding member 40.

The elastic member 80 may be connected to the stand member 20 in a state of being supported by a spring mounting bracket 29. For this, a bracket fixing hole 25 may be formed at an upper central part of the vertical part 23 to be connected with the spring mounting bracket 29.

The elastic member 80 constantly exerts an elastic force in a direction across the up and down movement of the sliding member 40 so as to prevent the display unit 10 from falling due to gravity.

Referring to FIG. 6, the sliding member 40 may further include a spring supporting member 60 protruded rearward and biased by the elastic member 80.

The spring supporting member 60 shown in FIG. 6 may include a roller member divided into a first roller 61 and a second roller 63 arranged at predetermined intervals in the lateral direction, or along a horizontal axis X, from the center of the sliding member 40. Although FIG. 6 illustrates first and second rollers, any type of device may be used to support the elastic member, such as projections or stubs, and the device need not necessarily be a roller. In other words, in broad terms, the rollers 61 and 63 may be described as elastic member support devices, spring supporting members, or any other appropriate term.

The first and the second rollers 61 and 63 have a substantially cylindrical form including a spring groove 65 radially recessed along the outer circumference thereof to have a semicircular sectional shape so as to receive the elastic member 80.

The elastic member 80 includes a fixing part 81 fixedly supported by the spring mounting bracket 29, a biasing part 83 extended along the moving direction of the sliding member 40 to bias the spring supporting member 60 in one direction, and an elastic part 85 connecting the fixing part 81 with the biasing part 83 so as to supply an elastic force to the biasing part 83.

The elastic member 80 as shown in FIG. 6 is curved into an inverted V-shape, wherein the elastic part 85 and the biasing part 83 are formed in pairs symmetrically arranged with respect to the fixing part 81.

Specifically, the elastic member 80 may be constituted by first and second elastic parts 85a and 85b curvedly formed at both ends of the fixing part 81, and first and second biasing parts 83a and 83b curvedly extended from each end of the first and second elastic parts 85a and 85b to be spaced from each other.

Accordingly, an interval between the first and the second biasing parts 83a and 83b is decreased from upper ends toward lower ends of the biasing parts 83a and 83b. Therefore, elastic forces of the first and the second elastic parts 85a and 85b are exerted in a direction opposite to a facing direction of the first and the second biasing parts 83a and 83b, that is, in directions P1 and P2.

The fixing part 81, the elastic part 85 and the biasing part 83 may have a circular sectional shape. Also, other mechanical characteristics such as material, diameter, spring constant and the like of the above parts may be properly determined in consideration of the weight of the display unit 10.

The first and the second biasing parts 83a and 83b may be disposed between the first and the second rollers 61 and 63 when connected with the sliding member 40, as shown in FIG. 7.

Therefore, the first and the second biasing parts 83a and 83b disposed between the first and the second rollers 61 and 63 bias the first and the second rollers 61 and 63 outward, that is in the directions P1 and P2 substantially perpendicular to a vertical axis Y, respectively. Therefore, the sliding member 40 is maintained in a set position unless external force is applied thereto.

In other words, when the sliding member 40 is moved from the upper part to the lower part, the first and the second rollers 61 and 63 formed at the sliding member 40 respectively bias the first and the second biasing parts 83a and 83b of the elastic member 80 in a direction of narrowing the interval of the biasing parts 83a and 83b.

As a result, the first and the second biasing parts 83a and 83b constantly exert elastic forces on the first and the second rollers 61 and 63, respectively, in a direction substantially perpendicular to the moving axis S of the sliding member 40, that is, in a direction from the center C toward lateral sides 41 of the sliding member 40. The center C may be a vertical axis located at a horizontal center of the sliding member 40.

Since the elastic forces of the first and the second biasing parts 83a and 83b are exerted so as to prevent the display unit 10 from falling due to gravity, the sliding member 40 may be maintained at an adjusted position.

Thus, the installation height of the display unit 10 is adjustable by the elastic member 80 having the biasing part 83 elongated in the length direction of the vertical positioning unit 30, and consequently the vertical positioning unit 30 may achieve the slim structure.

More specifically, the thickness of the stand member 20 may be greatly reduced since the vertical positioning unit 30 requires a space only as thick as a sectional surface of the biasing part 83 of the elastic member 80.

In addition, when the sliding member 40 is moved down, the first and the second biasing parts 83a and 83b support lower parts of the first and the second rollers 61 and 63 and, simultaneously, supply predetermined recovery forces upward. Therefore, the user is able to lift the display unit 10 with a minor force.

Figure 8:
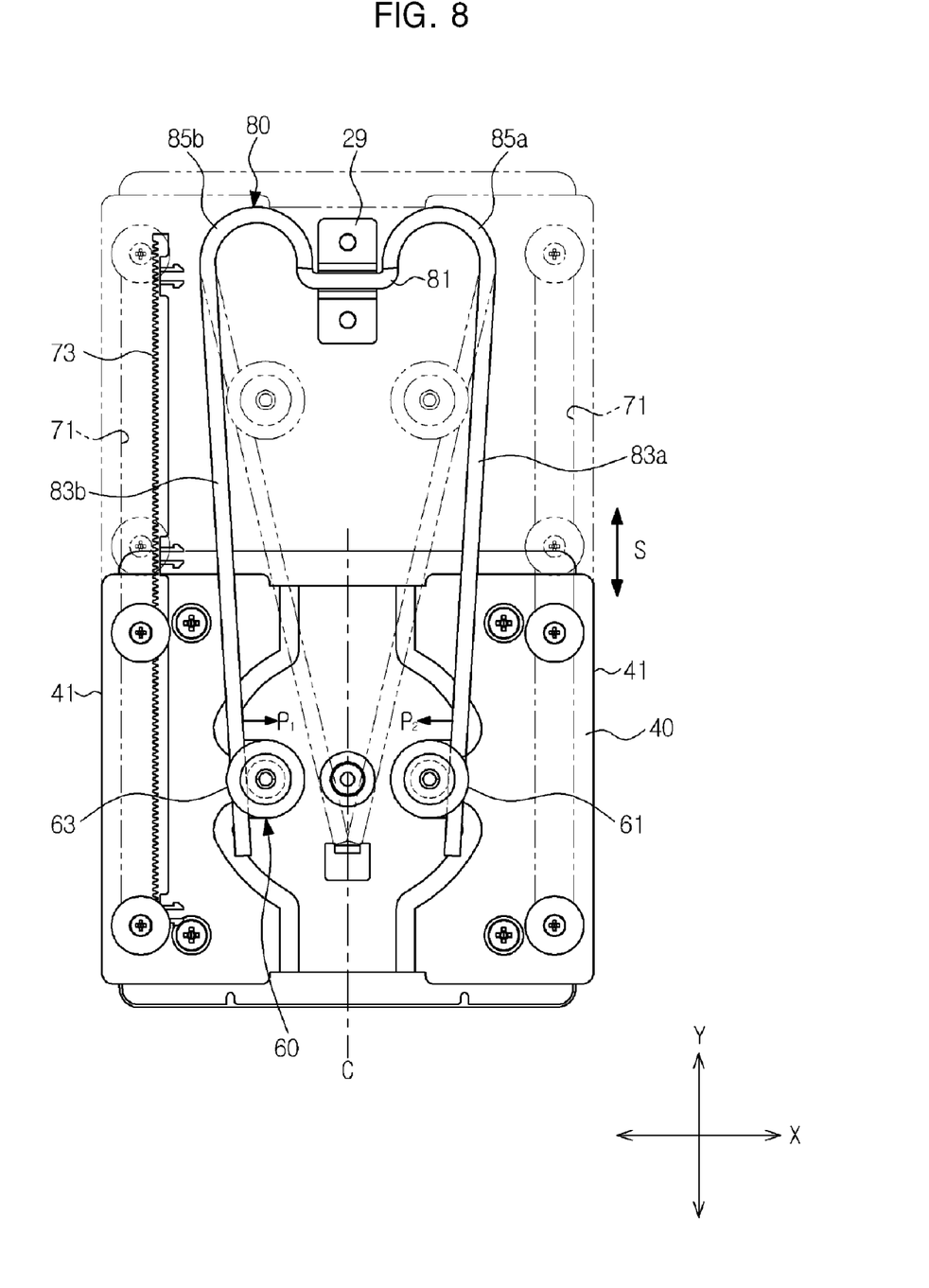
FIG. 8 is a view showing the operational state of an vertical positioning unit according to another embodiment of the present general inventive concept.
Figure 9:
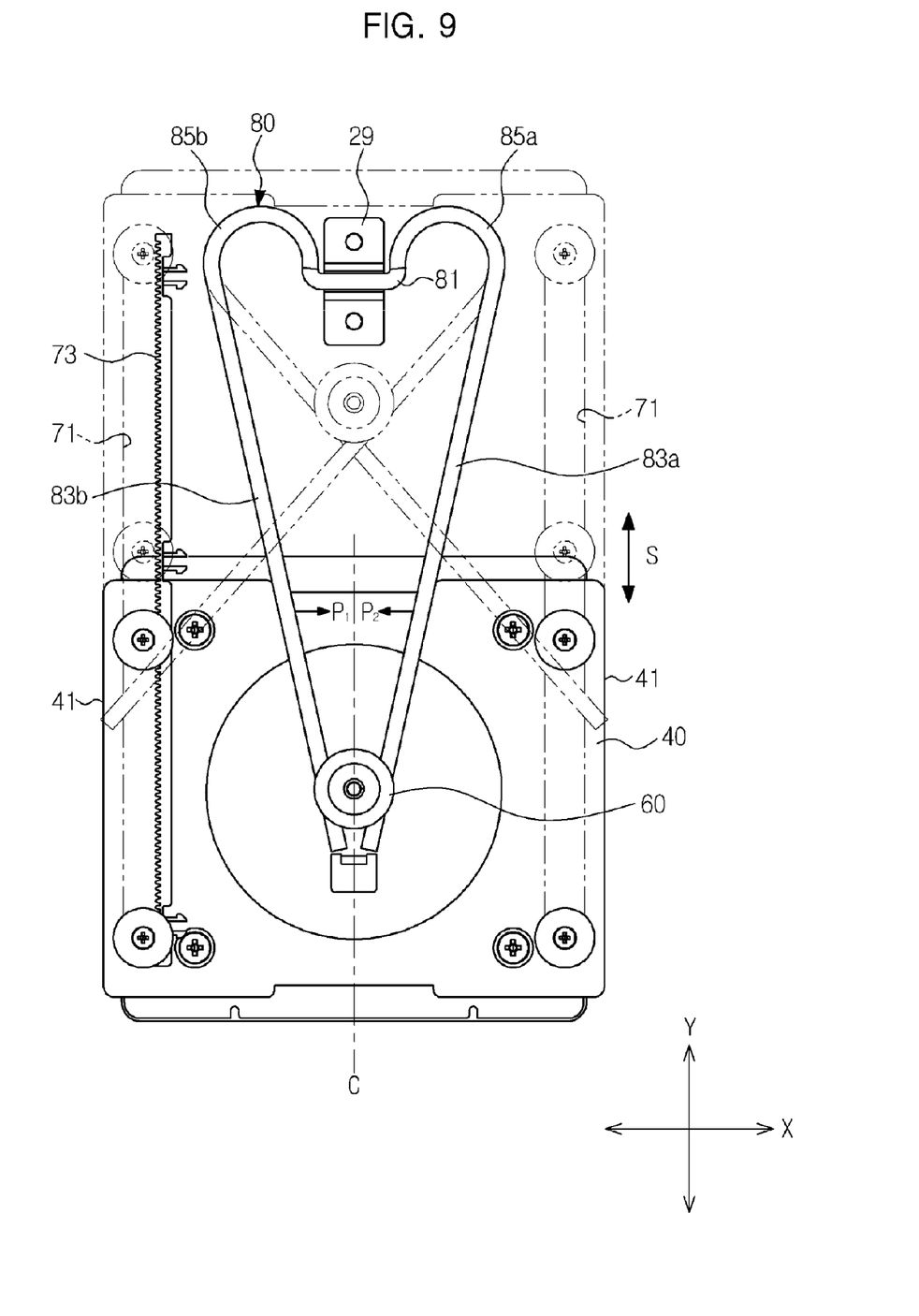
FIG. 9 is a view showing the operational state of an vertical positioning unit according to still another embodiment of the present general inventive concept.

FIG. 8 and FIG. 9 show the operational state of vertical positioning units of the image display device, according to other embodiments of the present general inventive concept.

Whereas the first and the second biasing parts 83a and 83b of the elastic member 80 shown in FIG. 7 are designed to exert biasing forces toward both lateral sides 41 of the sliding member 40, an vertical positioning unit according to the embodiment as shown in FIG. 8 has the first and the second biasing parts 83a and 83b curvedly extended from the upper part to gradually meet each other toward the lower part. That is, the first and the second biasing parts 83a and 83b exert biasing forces from the lateral sides 41 toward the center C of the sliding member 40.

In other words, as the sliding member 40 is moved from the upper part to the lower part, the first and the second rollers 61 and 63 of the sliding member 40 bias the biasing parts 83a and 83b of the elastic member 80 in a direction of distancing the biasing parts 83a and 83b.

Therefore, the elastic biasing forces of the biasing parts 83a and 83b are constantly applied to the first and the second rollers 61 and 63 in the directions P1 and P2 of FIG. 8, that is the facing direction, so that the display unit 10 is maintained in a set position.

In addition, whereas the spring supporting member 60 according to the embodiment of FIG. 8 includes the first and the second rollers 61 and 63 disposed between the first and the second biasing parts 83a and 83b, the spring supporting member 60 according to still another embodiment may include a single roller member disposed at the center C of the sliding member 50 as shown in FIG. 9.

However, the technical scope of the present general inventive concept is not limited to the above description but may further include other embodiments as follows.

First, the elastic member may include only one biasing part differently from the above-described embodiments wherein the elastic member has the first and the second biasing parts.

Although the first and the second biasing parts of the elastic member according to the embodiments are integrally formed, the first and the second biasing parts may be separately formed.

Furthermore, although the first and the second biasing parts according to the above embodiments are designed to bias the spring supporting member formed at the sliding member, the first and the second biasing parts being separately formed may bias both lateral sides of the sliding member, respectively.

That is, the fixing part 81, the biasing part 83, and the elastic part 85 of the elastic member 80 may be structured in any manner so long as the biasing part 83 exerts a constant elastic force on the sliding member 40 in a direction substantially perpendicular to the moving direction of the sliding member 40, to thereby maintain the adjusted position of the display unit 10.

The vertical positioning unit 30 of the display unit 10 according to the embodiment as shown in FIG. 6 may further include a rotating member 90 connected to a rear surface of the sliding member 40 to rotate about a rotational shaft 91.

The rotating member 90 is fixedly connected to the display unit 10 to enable tilting of the display unit 10.

Figure 10A:
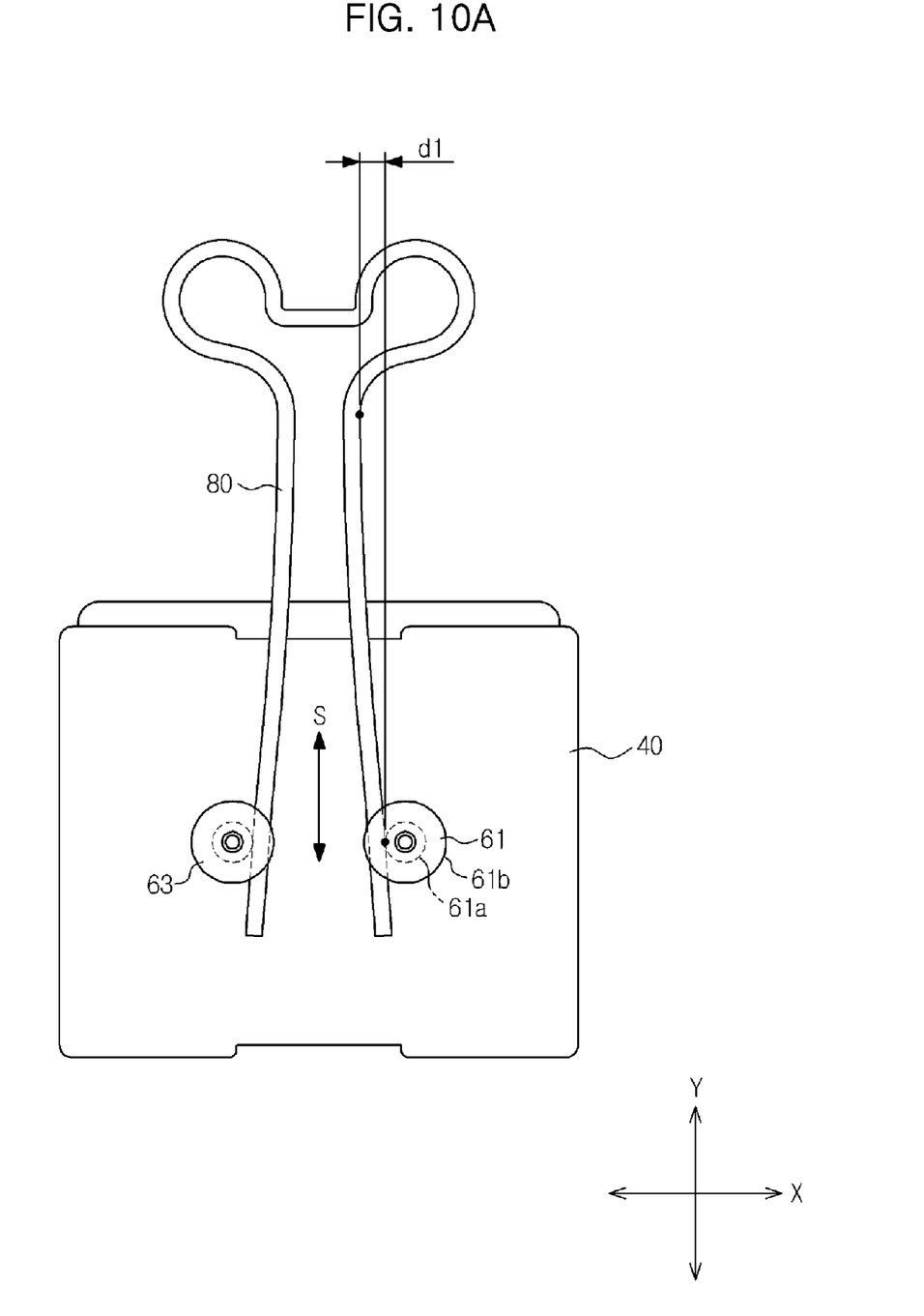
FIGS. 10A-10C illustrate a structure of an elastic member and a roller according to an embodiment of the present general inventive concept.
Figure 10B:
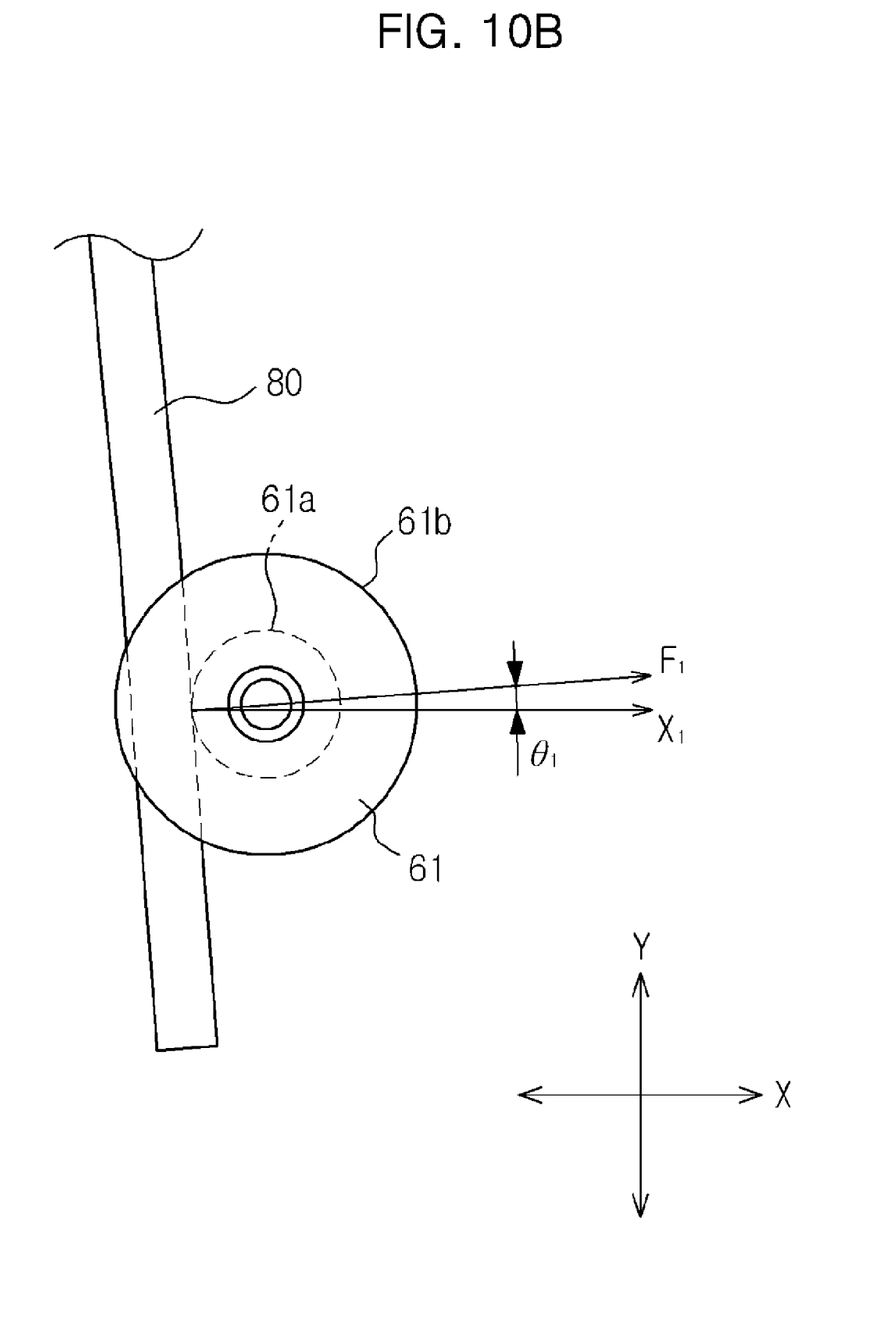
Figure 10C:
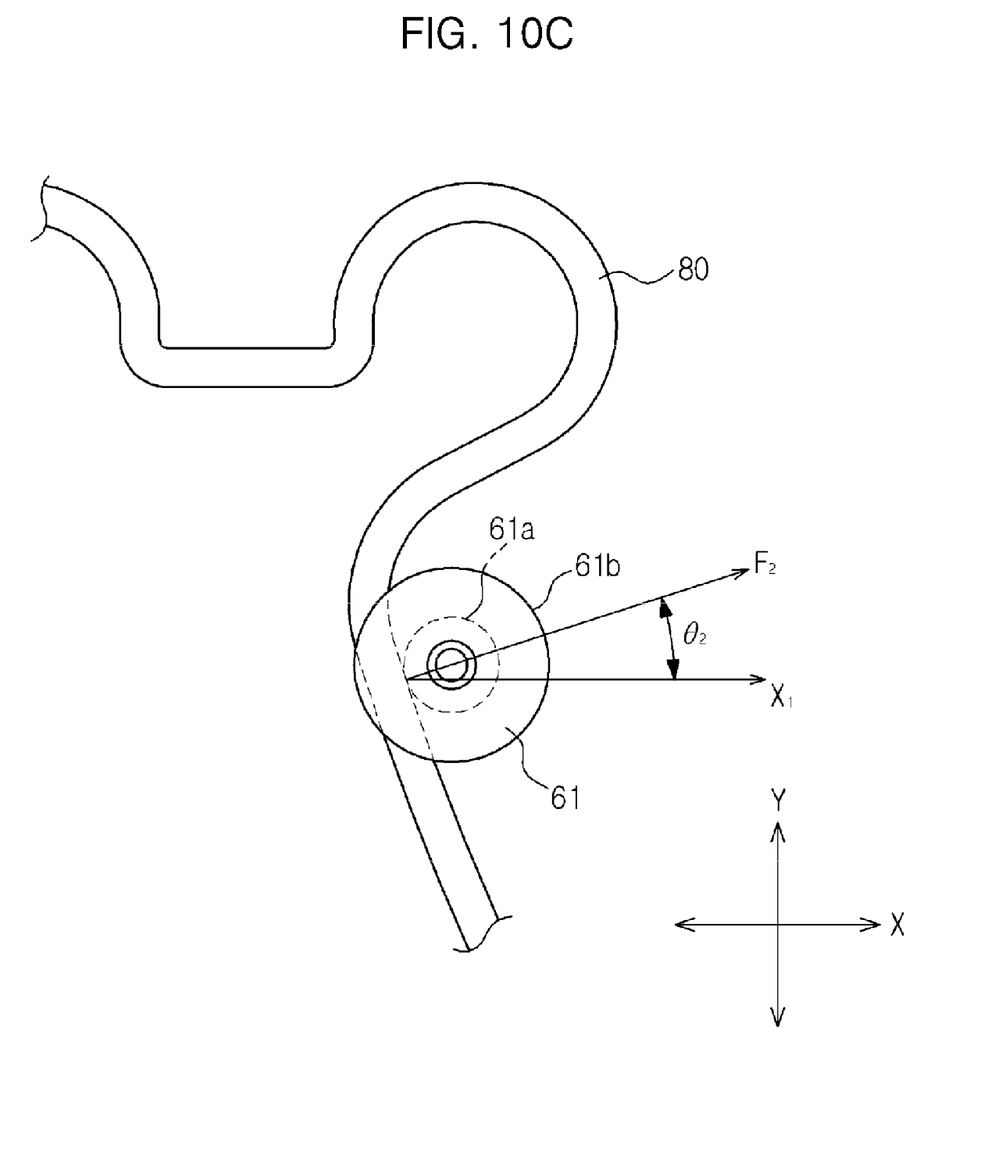

FIGS. 10A-10C illustrate a relationship between the elastic member 80 and a roller 61. As illustrated in FIG. 10A, a first roller 61 includes an inner surface 61a and a side surface 61b. The elastic member 80 exerts a force primarily against the inner surface 61a, and the side surface 61b is primarily for maintaining the position of the elastic member 80 against the inner surface 61a. A gap d1 may exist between a point A on the elastic member 80 and an inner surface 61a of the first roller 61 closest to the point A. The point A may be defined as a point on the substantially vertical portion of the elastic member 80 located immediately adjacent to an elastic part 85a of the elastic member 80.

When a sliding axis S of the sliding member 40 is defined as parallel to a vertical axis Y, and a horizontal axis X is perpendicular to each of the sliding axis S and the vertical axis Y, then the gap d1 may cause the elastic member 80 to exert a force against the roller 61 in a direction that is not exactly parallel to the horizontal axis X. In other words, while the elastic member 80 may exert a force against the roller 61 in a direction that is substantially parallel to the horizontal axis X, the direction need not be exactly parallel to the horizontal axis X.

In further detail, FIG. 10B illustrates a relationship between the elastic member 80 and the roller 61 when the sliding member 40 is in a lowered state, or when the roller 61 is far from the point A on the elastic member 80. When the roller 61 is located at a position far from the point A on the elastic member 80, the elastic member 80 may exert a force F1 against the inner surface 61a of the roller 61 in a direction that is inclined at an angle θ1 with respect to the horizontal axis X.

On the other hand, as illustrated in FIG. 10C, when the roller 61 is located at a position closer to the point A on the elastic member 80 than in FIG. 10B, the elastic member 80 exerts a force F2 on the inner surface of the roller 61 that is inclined by an angle θ2 with respect to the horizontal axis X. As shown in FIGS. 10B and 10C, the angle θ1 is less than the angle θ2. However, each of the directions of the force F1 and F2 may be considered "substantially perpendicular" to the vertical axis Y or the sliding direction S in this specification and the corresponding claims.

The directions corresponding to the respective forces F1 and F2 may be calculated to ensure that the elastic member 80 does not cause the roller 61 to move the sliding member 40 downward or upward without user input. For example, it may be determined based on a stiffness of the roller 61 or a resistance of the roller 61 to a rolling motion that an inclination angle θ of 30 degrees would ensure that the elastic member 80 would maintain a substantially horizontal force against the roller 61 without causing the roller 61 to roll without user-exerted force.

The magnitude of the force exerted by the elastic member 80, the stiffness of the roller 61 or resistance of the roller 61 to a rolling motion, and the size of a gap d1 between a point A on the elastic member 80 and an inner surface 61a of the roller 61 may all be used to determine an appropriate shape of the elastic member 80 to ensure that the direction of the force exerted by the elastic member 80 against the inner surface 61a of the roller 61 is sufficient to maintain the sliding member 40 at a stationary state.

While FIGS. 10A-10C illustrate an elastic member 80 having a configuration similar to that of FIG. 7, a same principle applies to various configurations of elastic member 80 and rollers 60, 61, and 63. For example, in a configuration according to FIG. 8 in which an elastic member 80 exerts a force towards a center axis of the sliding member 40, the point A of the elastic member may be located outside an outermost surface of the inner surface 61a of the roller 61. In such a case, the inclination angle θ would still be positive.

On the other hand, if the elastic member is mounted upside-down with respect to FIG. 7 or 8, so that the roller 61 is located above the point A on the vertical axis, and the biasing parts 83 extend upwards, then the inclination angle formed by the force of the elastic member 80 with respect to the horizontal axis X may be a negative angle.

As is apparent from the above description, an vertical positioning unit for the image display device according to the embodiments of the present general inventive concept has a slim structure, thereby considerably reducing the width of a stand member.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A vertical positioning unit for an image display device, comprising:
    a sliding member connected to a stand member and movable up and down along an imaginary movement axis with respect to the stand member;
    a spring supporting member located on the sliding member; and
    an elastic member connected to the stand member to constantly exert an elastic force on the spring supporting member in a direction substantially perpendicular to the movement axis of the sliding member while the sliding member moves up and down.

2. The vertical positioning unit according to claim 1, further comprising a guide unit to guide the movement of the sliding member so that the sliding member is not shaken in a lateral direction during the up and down movement.

3. The vertical positioning unit according to claim 1, wherein the elastic member comprises:
    a fixing part;
    a biasing part extended in a length direction to press the spring supporting member; and
    an elastic part interconnecting the fixing part and the biasing part so as to apply an elastic force to the biasing part.

4. The vertical positioning unit according to claim 3, wherein the spring supporting member comprises a roller member supported by the biasing part.

5. The vertical positioning unit according to claim 3, wherein the spring supporting member comprises first and second rollers arranged in a lateral direction,
    the elastic part comprises first and second elastic parts formed at both ends of the fixing part, and
    the biasing part comprises first and second biasing parts extended respectively from the first and the second elastic parts.

6. The vertical positioning unit according to claim 5, wherein the first and the second biasing parts are disposed between the first and the second rollers to exert elastic forces in a direction of being spaced from each other.

7. The vertical positioning unit according to claim 5, wherein the first and the second rollers are disposed between the first and the second biasing parts exerting elastic forces in a direction toward each other.

8. The vertical positioning unit according to claim 3, wherein the elastic part comprises first and second elastic parts extended respectively from both ends of the fixing part,
    the biasing part comprises first and second biasing parts extended respectively from the first and the second elastic parts, and
    the spring supporting member is disposed between the first and the second biasing parts exerting elastic forces toward each other.

9. The vertical positioning unit according to claim 2, wherein the guide unit comprises:
    a guide slot formed on the stand member in a vertical direction; and a guide projection formed at the sliding member to be inserted in the guide slot.

10. The vertical positioning unit according to claim 9, wherein the guide projection includes a roller inserted in the guide slot.

11. The vertical positioning unit according to claim 2, wherein the guide unit comprises:
- a guide slot formed on the stand member in a vertical direction and equipped with a rack gear unit at one side thereof; and
- a gear unit formed at the sliding member to be inserted in the guide slot and meshed with the rack gear unit.

12. An image display device comprising:
a display unit;
a stand member connected to a rear surface of the display unit; and
a vertical positioning unit to adjust a height of the display unit with respect to the stand member,
wherein the vertical positioning unit has a sliding member movable along a vertical axis in the up and down direction and an elastic member including a biasing part elastically and constantly supporting the sliding member in a moving direction substantially perpendicular to the vertical axis.

13. The image display device according to claim 12, wherein the biasing part is extended along the moving direction of the sliding member.

14. The image display device according to claim 13, wherein the biasing part has a curved form.

15. The image display device according to claim 14, further comprising a spring supporting member protruded from the stand member to be elastically supported by the biasing part.

16. The image display device according to claim 15, wherein the biasing part exerts an elastic force from the center toward a lateral side of the sliding member.

17. The image display device according to claim 16, wherein a pair of the spring supporting members are arranged in a lateral direction, and
the biasing part comprises first and second biasing parts disposed at an interval between the spring supporting members and curvedly extended to be spaced from each other from an upper part toward a lower part.

18. The image display device according to claim 15, wherein the biasing part exerts an elastic force in a direction from a lateral side toward the center of the sliding member.

19. The image display device according to claim 18, wherein the biasing part comprises first and second biasing parts curvedly extended in a direction to gradually meet each other from an upper part toward a lower part, and
the spring supporting member is disposed between the first and the second biasing parts.

20. The image display device according to claim 19, wherein a pair of the spring supporting members is arranged in a lateral direction to be supported by the first and the second biasing parts, respectively.

* * * * *